United States Patent
Fonseka et al.

(10) Patent No.: US 11,631,213 B2
(45) Date of Patent: Apr. 18, 2023

(54) METHOD AND SYSTEM FOR REAL-TIME 3D CAPTURE AND LIVE FEEDBACK WITH MONOCULAR CAMERAS

(71) Applicant: Magic Leap, Inc., Plantation, FL (US)

(72) Inventors: Erik Fonseka, Mountain View, CA (US); Alexander Ilic, Zurich (CH)

(73) Assignee: Magic Leap, Inc., Plantation, FL (US)

(*) Notice: Subject to any disclaimer, the term of this patent is extended or adjusted under 35 U.S.C. 154(b) by 129 days.

(21) Appl. No.: 16/067,210

(22) PCT Filed: Dec. 30, 2016

(86) PCT No.: PCT/IB2016/001985
§ 371 (c)(1),
(2) Date: Jun. 29, 2018

(87) PCT Pub. No.: WO2017/115149
PCT Pub. Date: Jul. 6, 2017

(65) Prior Publication Data
US 2021/0209835 A1 Jul. 8, 2021

Related U.S. Application Data

(60) Provisional application No. 62/273,821, filed on Dec. 31, 2015.

(51) Int. Cl.
*G06T 15/20* (2011.01)
*G06T 17/20* (2006.01)
*G06T 7/55* (2017.01)

(52) U.S. Cl.
CPC ............ *G06T 15/205* (2013.01); *G06T 7/55* (2017.01); *G06T 17/20* (2013.01); *G06T 2207/10016* (2013.01)

(58) Field of Classification Search
None
See application file for complete search history.

(56) References Cited

U.S. PATENT DOCUMENTS

| 7,103,211 | B1 | 9/2006 | Medioni et al. |
| 7,602,404 | B1* | 10/2009 | Reinhardt ............ G01C 11/00 345/629 |

(Continued)

FOREIGN PATENT DOCUMENTS

| CN | 101908219 A | 12/2010 |
| CN | 104599284 A | 5/2015 |

(Continued)

OTHER PUBLICATIONS

Chinese Office Action dated Apr. 6, 2021 in connection with Chinese Application No. 201680082863.5.

(Continued)

*Primary Examiner* — Tize Ma
(74) *Attorney, Agent, or Firm* — Wolf, Greenfield & Sacks, P.C.

(57) ABSTRACT

Forming a 3D representation of an object using a portable electronic device with a camera. A sequence of image frames, captured with the camera may be processed to generate 3D information about the object. This 3D information may be used to present a visual representation of the object as real-time feedback to a user, indicating confidence of 3D information for regions of the object. Feedback may be a composite image based on surfaces in a 3D model derived from the 3D information given visual characteristics derived from the image frames. The 3D information may be used in a number of ways, including as an input to a 3D printer or an input, representing, in whole or in part, an avatar for a game or other purposes. To enable processing to be performed on a portable device, a portion of the image (Continued)

frames may be selected for processing with higher resolution.

20 Claims, 7 Drawing Sheets

(56) References Cited

U.S. PATENT DOCUMENTS

| | | | |
|---|---|---|---|
| 8,243,123 | B1 | 8/2012 | Geshwind et al. |
| 8,339,467 | B2 | 12/2012 | Zahnert et al. |
| 8,582,182 | B2 | 11/2013 | Zahnert et al. |
| 8,655,094 | B2 | 2/2014 | Miller et al. |
| 8,659,596 | B2 | 2/2014 | Corazza et al. |
| 8,723,885 | B2 | 5/2014 | Zahnert et al. |
| 8,982,122 | B2 | 3/2015 | Corazza et al. |
| 2004/0041804 | A1 | 3/2004 | Ives et al. |
| 2006/0003111 | A1 | 1/2006 | Tseng |
| 2009/0066693 | A1 | 3/2009 | Carson |
| 2011/0025853 | A1* | 2/2011 | Richardson ............ H04N 5/247 348/E7.085 |
| 2011/0164109 | A1* | 7/2011 | Baldridge ............ H04N 13/266 348/43 |
| 2013/0307848 | A1 | 11/2013 | Tena et al. |
| 2013/0329020 | A1 | 12/2013 | Kriveshko et al. |
| 2014/0112573 | A1 | 4/2014 | Francis, Jr. et al. |
| 2015/0055821 | A1 | 2/2015 | Fotland |
| 2015/0243324 | A1* | 8/2015 | San ...................... H04N 13/261 386/278 |
| 2015/0381968 | A1* | 12/2015 | Arora ........................ G06T 7/55 348/47 |
| 2016/0086336 | A1 | 3/2016 | Lin et al. |
| 2018/0144535 | A1* | 5/2018 | Ford ...................... G06T 17/20 |
| 2019/0342533 | A1 | 11/2019 | Ilic et al. |
| 2019/0362469 | A1 | 11/2019 | Ilic et al. |
| 2020/0007720 | A1 | 1/2020 | Ilic |
| 2020/0162629 | A1 | 5/2020 | Ilic et al. |
| 2020/0374455 | A1 | 11/2020 | Ilic et al. |

FOREIGN PATENT DOCUMENTS

| | | |
|---|---|---|
| EP | 2851868 | 3/2015 |
| JP | 2004-077221 A | 3/2004 |
| JP | 2011-086164 A | 4/2011 |
| WO | WO 2007/084589 A2 | 7/2007 |
| WO | WO 2012/106070 A2 | 8/2012 |
| WO | WO 2013/054240 A1 | 4/2013 |
| WO | WO 2014/092740 A1 | 6/2014 |
| WO | WO 2014/191055 A1 | 12/2014 |
| WO | WO 2015/173173 A1 | 11/2015 |

OTHER PUBLICATIONS

U.S. Appl. No. 15/048,875, filed Feb. 19, 2016, Zahnert et al.
U.S. Appl. No. 14/914,926, filed Feb. 26, 2016, Ilie et al.
U.S. Appl. No. 15/173,355, filed Jun. 3, 2016, Ilic.
U.S. Appl. No. 15/109,466, filed Jul. 1, 2016, Ilie et al.
U.S. Appl. No. 15/109,476, filed Jul. 1, 2016, Ilie et al.
U.S. Appl. No. 15/308,959, filed Nov. 4, 2016, Ilie et al.
PCT/IB2016/001985, May 22, 2017, International Search Report and Written Opinion.
PCT/IB2016/001985, Jul. 12, 2018, International Preliminary Report on Patentability.
International Search Report and Written Opinion for International Application No. PCT/IB2016/001985 dated May 22, 2017.
International Preliminary Report on Patentability for International Application No. PCT/IB2016/001985 dated Jul. 12, 2018.
EP 16847598.6, dated Jan. 11, 2021, European Communication.
European communication dated Jan. 11, 2021 in connection with European Application No. 16847598.6.
Japanese Office Action dated Nov. 24, 2020 in connection with Japanese Application No. 2018-553329.
JP 2018-553329, dated Nov. 24, 2020, Japanese Office Action.
[No Author Listed], 3D Reconstruction with Depth from Stereo—Qualcomm. Jun. 23, 2015. 2 pages. URL:https://www.qualcomm.com/videos/3d-reconstruction-depth-stereo [retrieved on Mar. 17, 2022].
[No Author Listed], Fyusion—Beautiful 3D images with AI understanding. Fyusion, Inc. 2022. 6 pages. URL:http://fyusion.com [retrieved on Mar. 17, 2022].
[No Author Listed], Intel Realsense Technology. Intel Corporation. 2022. 6 pages. URL:https://www.intel.com/content/www/US/en/architecture-and-technology/realsense-overview.html [retrieved on Mar. 17, 2022].
[No Author Listed], Snapchat—The fastest way to share a moment. 2022. 1 page. URL:http://www.seene.co [retrieved on Mar. 17, 2022].
[No Author Listed], Trnio 3D Scanner. 2022. 5 pages. URL:http://www.trnio.com [retrieved on Mar. 17, 2022].
[No Author Listed], Structure—The world's leading healthcare 3D scanning platform. Occipital, Inc. 2022. 7 pages. URL:http://www.structure.io [retrieved on Mar. 17, 2022].
Baran et al., Automatic rigging and animation of 3d characters. ACM Transactions on Graphics (TOG). 2007. 8 pages.
Blanz et al., A morphable model for the synthesis of 3D faces. Proceedings of the 26th annual conference on Computer graphics and interactive techniques. Jul. 1999, pp. 187-194.
Curless, From range scans to 3D models. ACM SIGGRAPH Computer Graphics. Nov. 4, 1999;33(4):38-41.
Faessler et al., Autonomous, vision-based flight and live dense 3D mapping with a quadrotor micro aerial vehicle. Journal of Field Robotics. Jun. 2016;33(4):431-50.
Forster et al., Collaborative monocular slam with multiple micro aerial vehicles. 2013 IEEE/RSJ International Conference on Intelligent Robots and Systems. Nov. 3-7, 2013. pp. 3963-3970.
Forster et al., Continuous on-board monocular-vision-based elevation mapping applied to autonomous landing of micro aerial vehicles. 2015 IEEE International Conference on Robotics and Automation (ICRA). May 26-30, 2015. pp. 111-118.
Forster et al., IMU preintegration on manifold for efficient visual-inertial maximum-a-posteriori estimation. Robotics: Science and Systems. Jul. 2015. 10 pages.
Forster et al., SVO: Fast semi-direct monocular visual odometry. 2014 IEEE international conference on robotics and automation (ICRA). May 31 - Jun. 7, 2014. pp. 15-22.
Hirshberg et al., Coregistration: Simultaneous alignment and modeling of articulated 3D shape. Proceedings of the 12th European conference on Computer Vision—vol. Part VI. 2012. pp 242-255.
Lanman et al., Build your own 3D scanner: 3D photography for beginners. ACM SIGGRAPH 2009 Courses. Aug. 5, 2009. 94 pages.
Li et al., 3D self-portraits. ACM Transactions on Graphics (TOG). Nov. 2013;32(6):1-9.
Majdik et al., Micro air vehicle localization and position tracking from textured 3d cadastral models. 2014 IEEE International Conference on Robotics and Automation (ICRA). May 31-Jun. 7, 2014. pp. 920-927.
Pizzoli et al., REMODE: Probabilistic, monocular dense reconstruction in real time. 2014 IEEE International Conference on Robotics and Automation (ICRA). May 31-Jun. 7, 2014. pp. 2609-2616.
Saurer et al., A minimal solution to the rolling shutter pose estimation problem. 2015 IEEE/RSJ International Conference on Intelligent Robots and Systems (IROS). 2015. 7 pages.
Tanskanen et al., Live metric 3D reconstruction on mobile phones. Proceedings of the IEEE International Conference on Computer Vision. 2013. pp. 65-72.
Tanskanen et al., Semi-direct EKF-based monocular visual-inertial odometry. 2015 IEEE/RSJ International Conference on Intelligent Robots and Systems (IROS). Sep. 28-Oct. 2, 2015. pp. 6073-6078.
Vlasic et al., Dynamic shape capture using multi-view photometric stereo. ACM Transaction on Graphics. Dec. 2009;28(5):1-11.
Weise et al., Face/off: Live facial puppetry. Eurographics/ ACM SIGGRAPH Symposium on Computer Animation. 2009. 10 pages.

(56) References Cited

OTHER PUBLICATIONS

Weise et al., In-hand scanning with online loop closure. 2009 IEEE 12th International Conference on Computer Vision Workshops, ICCV Workshops. Sep. 2009. pp. 1630-1637.
Weise et al., Online loop closure for real-time interactive 3D scanning. Computer Vision and Image Understanding. 2011;115(5):635-48.
Extended European Search Report dated Aug. 4, 2022 in connection with European Application No. 22167743.8.
Japanese Office Action dated Nov. 1, 2022 in connection with Japanese Application No. 2021-136196.

* cited by examiner

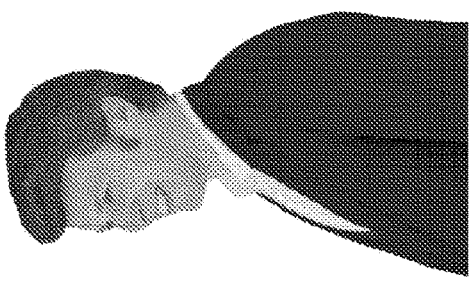
FIG. 6A
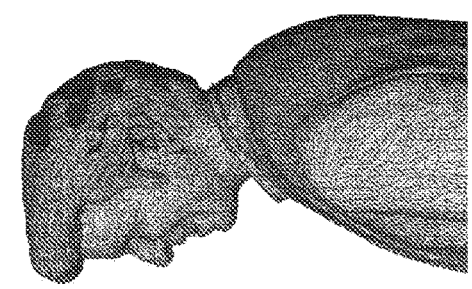
FIG. 6B
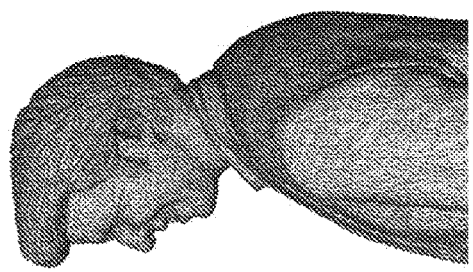
FIG. 6C
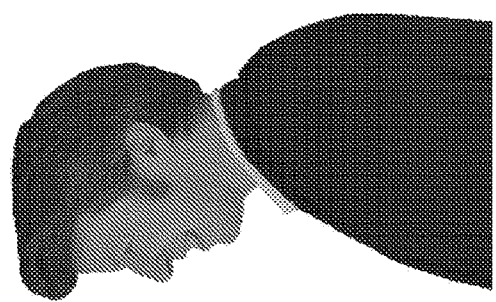
FIG. 6D
FIG. 6E

METHOD AND SYSTEM FOR REAL-TIME 3D CAPTURE AND LIVE FEEDBACK WITH MONOCULAR CAMERAS

CROSS-REFERENCE TO RELATED APPLICATIONS

This application is a national stage filing under 35 U.S.C. § 371 of International Patent Application Serial No. PCT/IB2016/001985, entitled "A METHOD AND SYSTEM FOR REAL-TIME 3D CAPTURE AND LIVE FEEDBACK WITH MONOCULAR CAMERAS," filed on Dec. 30, 2016, which claims the benefit under 35 U.S.C. § 119 to U.S. Provisional Application Ser. No. 62/273,821, entitled "A METHOD AND SYSTEM FOR REALTIME 3D CAPTURE AND LIVE FEEDBACK WITH MONOCULAR CAMERAS," filed on Dec. 31, 2015; each of which are incorporated by reference herein in their entirety.

BACKGROUND

Hardware 3D cameras based on RGB stereo [15, 22, 24] or infrared stereo systems [20-23] are available on the market. In additional to well-known offline processing methods [3, 8], they can provide dense depth-maps at a high framerate and at low computational effort to enable user experiences with real-time 3D reconstruction [17, 18, 20, 22].

On the other hand, monocular approaches that leverage the built-in camera of smartphones have shown an alternative path towards spatial photography.

However, these approaches often rely on methods with little or no feedback during capturing and therefore yield low performance and low quality results compared to hardware 3D cameras. The 3D models produced with Cloud-based processing or guided capturing approaches are only available after the capture process is completed, they are quite limited in their field of use and lead to undesired results.

BRIEF DESCRIPTION OF THE DRAWINGS

FIGS. 6A-6E are images illustrating a process of guiding a user to move a phone to gather data that increases the confidence of depth information for portions of an image, with FIG. 6A representing a photograph of an object, FIGS. 6B-6D representing successive phases of an information capture process in which additional depth information is captured, and FIG. 6E illustrates a finished image with depth and color information rendered from a 3D model.

DETAILED DESCRIPTION

Figure 1:
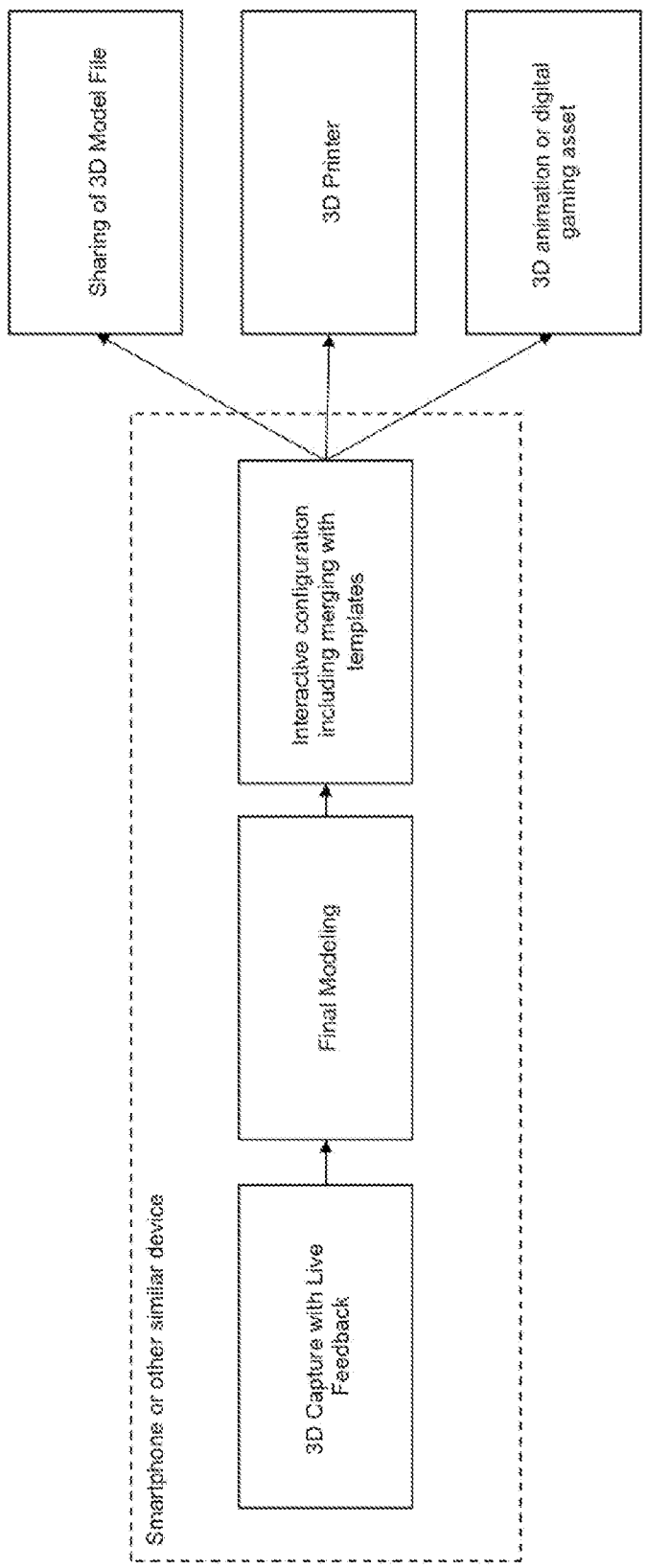
FIG. 1 is a flow diagram illustrating an exemplary key workflow from capturing, to post-processing, interactive configuration and output as digital 3D model, 3D printer, or animation file.

The inventors have recognized and appreciated that known systems for creating 3D images have several limitations that hinder a mass-market adoption, such as significant additional bill-of-material costs, increased battery consumption, requirements of a larger form-factor for mobile devices, limited performance in common light conditions (e.g. bright sunlight), limited performance for short or far distances.

This application describes techniques to make 3D scanning widely available. Embodiments may be implemented in a portable electronic device with a camera. For purposes of illustration, a smartphone is used as an example of such a portable electronic device. Processing techniques as described herein can assemble image frames depicting an object into a 3D map of the object using a relatively small amount of processing power, such that a processor of a portable electronic device may perform the processing fast enough that a 3D image may be constructed in real-time with sufficient image information to allow a user to see which portions of the object have been adequately scanned and which portions require additional image information to be acquired. For example, "key frames" (as described below) may be processed in about 300-600 ms, while frames between the key frames may be processed in about 10-50 ms. As a specific example, key frames may be processed in about 500 ms and other frames in about 20 ms using a commercially available smartphone processor. Processing at this speed enables a visualization of the object to be presented in real time as it is being scanned with the portable electronic device.

Today's smartphone have a user and a world-facing camera. With techniques as described herein, either or both of these cameras can be enhanced for 3D sensing capabilities that are similar to hardware 3D cameras. Due to occlusions, several angles of an object need to be captured to ensure a reliable 3D modeling. The inventors recognized the desirability of real-time feedback and techniques for providing intuitive user feedback while capturing images frames that continuously increases the quality of a 3D model of an object. Embodiments of the capture techniques described herein are computationally so efficient and adaptive that they can run autonomously on standard mobile devices (which may comprise, in some exemplary embodiments, a single camera, IMU sensor(s), display, etc).

The present application describes a software 3D camera approach (i.e. emulating the output properties of a hardware 3D camera) yielding in a real-time What-You-See-Is-What-You-Get experience for creating 3D printable models that is so efficient and robust that it can run on regular smartphones. In some embodiments, the processing described herein may be implemented by computer-executable instructions executing on a processor in the smartphone. That processing may produce a depth map of an object, which may be rendered on a display of the smartphone using smartphone hardware, such as a GPU.

The described processing techniques build on proven principles of real-time robotics [seem for example references 4, 5, 6, 10, 11 (which are incorporated herein by reference) for suitable techniques] and applies them to a real-time feedback system for 3D scanning, which may be used where a human is in control of moving a camera and exposed to a live 3D reconstruction as feedback.

Embodiments Related to Capturing

In accordance with some embodiments, techniques as described herein may be used for capturing images. For example, the techniques may be used to implement a 3D camera, using software. That software may execute on a portable electronic device (such as a smartphone) with a camera supplying images, a processor to process those images and a display to visually display the images and/or visual representations of a model constructed from the images and/or other information. Alternatively or additionally, some or all of the image processing may be performed on a computing device coupled to an electronic device with a camera to capture images. In some embodiments, techniques as described herein may be used to simulate a hardware 3D camera by processing image frames acquired with a monocular camera on a portable electronic device that is being moved to capture image frames from different perspectives.

In some embodiment, a system and method for a real-time, monocular depth camera based on multiple image frames and probabilistic depth-measurements is presented.

In some embodiment, the system uses a frequency-triggered key frame approach to provide depth maps at constant rate similar to a hardware 3D camera (stereo camera with or without additional time-of-flight or structured light measurements). Such an approach, for example, may be implemented by designating captured frames as "key frames" at a specific frequency. These key frames may be analyzed to determine image characteristics, including a dense depth map representing depth between numerous points on surfaces of objects depicted in the key frame and a point representing the point of view of the 3D image being formed. Frames between key frames in a sequence of images being captured may be processed to produce a sparse depth map. The sparse depth map may have depths computed for fewer points than the dense depth map. In some embodiments, for example, the sparse depth map may have 60-80% as many points as the dense depth map, or between 40-60%, or 20-40% or fewer. In some embodiments, the number of points in the sparse depth map may be dynamically selected based on factors such as processor speed, frame capture rate and/or speed at which the portable electronic device is being moved while the sequence of images is being captured. The processing of the intervening images may be performed on lower resolution versions of the image.

In some embodiment, the system uses a motion-based key frame triggering strategy to provide depth information based on movement of the device.

In some embodiment, the system uses a user-facing camera of a smartphone to capture the sequence of image frames.

In some embodiment, the system uses a world-facing camera of a smartphone to capture the sequence of image frames.

In some embodiment, the system is used to complement a hardware 3D camera as a fail-over in certain light conditions (e.g. in bright sunlight the Infrared projection of ToF/Structured doesn't work) or distances (the IR projection of hardware 3D cameras has issues operating at very short distances such as smaller than three feet or larger than ten feet).

App-Based 3D Scanning and Real-Time Feedback (i.e. Creating a Live View of a Reconstructed & Textured 3D Mesh, "What You See is What You Get")

In some embodiment, a system and method for a real-time 3D model reconstruction with a monocular camera is presented. Such a system may be implemented as computer-executable instructions encoded for execution on a processor of a smartphone, in a format considered an "app," which may execute entirely on the smart phone or through interaction with a server or other computing device where some or all of the processing described herein may be performed. Embodiments of such a system use local and global optimization based on probabilistic depth-maps to improve the quality of the mesh in real-time with the user's help.

In some embodiments, the system uses live meshing and texturing to visualize which areas have been captured in enough quality and to guide the user. For example, a depth map, created as a composite of the dense depth maps created from key frames and sparse depth maps created from other frames may be used to create a mesh representing surfaces of objects in the image. Other image information, selected based on position of the surfaces as indicated by the mesh, may be used to determine visual characteristics of these surfaces.

In some embodiment, the system uses live meshing and simple coloring to visualize the capture progress.

In some embodiment, the system uses a feedback based on a priors (i.e. we know what we scan) or basic polygons with simple coloring of already scanned areas.

In some embodiments, the system automatically performs checks for 3D printability and thus guides the user towards areas that require more attention during capturing.

We also describe an embodiment towards a full end-to-end use case for capturing people in 3D [2, 7, 9] for 3D printing and animation [1]—which was previously not possible in this way by just using mobile devices.

FIG. 1 illustrates an exemplary work flow in a system in which a camera of a smartphone is used to capture a sequence of image frames of an object. The user of the smartphone moves the smartphone so as to capture image frames of the object from multiple points of view. Processing of these image frames may allow points or other features on external surfaces of the object to be identified in the images and correlated.

Motion information about the smartphone between frames allows a computation of a relative position of the smartphone when different image frames were acquired (using an IMU of the smart phone, for example), allowing the perspective from which features in different image frames were acquired. These differences in perspective provide stereoscopic information from which can be computed a distance between those features and a point of view of a 3D image being formed. This depth information may be used as a 3D model of the object being scanned. Motion information may be obtained from sensors on the smartphone, such as may be included in an IMU of the smartphone. Alternatively or additionally, motion information may be computed from information in the image frames.

In some embodiments, this 3D modeling may be performed on image frames as they are acquired such that the 3D model may be depicted to the user as the image frames are being acquired and processed. This 3D model may serve as feedback to the user, indicating portions of the object that have been adequately imaged or portions for which additional image frames are required to produce an adequate model. In some embodiments, this real-time display of information may be based in whole or in part on information that does not provide the desired level of detail of a completed 3D image. All or portions of the real-time feedback image, for example, may have less resolution than a final image. Alternatively or additionally, the real-time feedback image may be based on a subset of the information that would be depicted in a final image, displaying a mesh representing locations of surfaces while omitting color, texture or other surface characteristics. Using a subset of information to be presented in the final image to display the feedback image may allow the feedback image to be displayed in real-time. Additional information may be stored, as part of the captured image frames or otherwise, and used to complete the final image after scanning of the object is completed.

Once the final 3D image is constructed from the image frames of the object, that image may be used in any of a number of ways. In some embodiments, the 3D image optionally may be configured in one or more ways before being used. That configuration, for example, may be performed interactively based on user inputs entered through an interface of the smartphone or in any other suitable way. That configuration may include processing to select the size or other characteristics of the 3D image and may include merging the image with templates representing an object of the type being imaged.

The configured image may then be passed to an output device or another system. The image, for example, may be sent to a 3D printer for printing a 3D model of the object that was imaged. As another example, the 3D image may be provided to a gaming system programmed to accept 3D models of objects (including avatars of people that can be displayed as part of the game. More generally the 3D image may be stored as a 3D model file (in a standardized or custom format) or provided to any other system configured to operate on such a 3D model.

Figure 2:
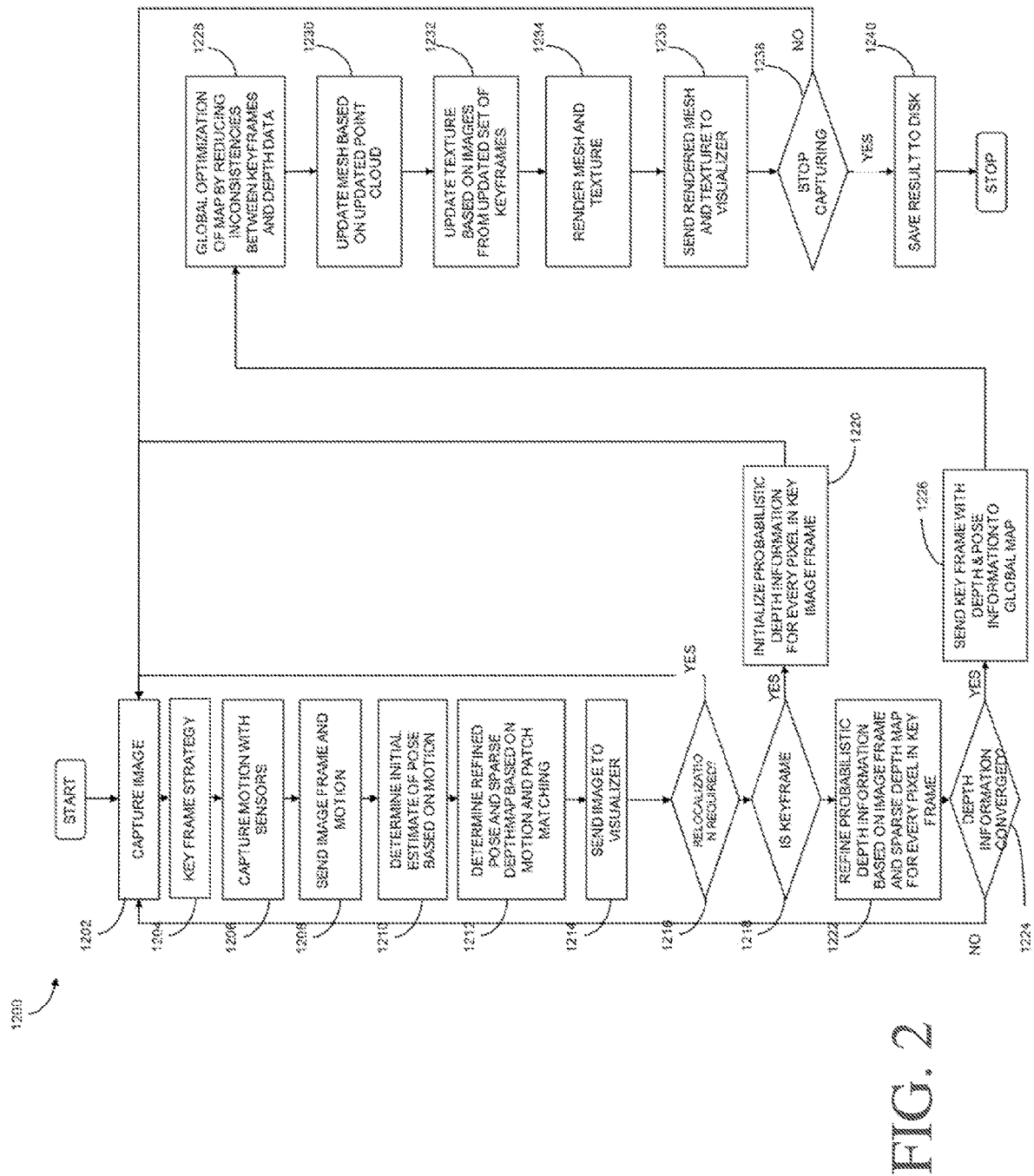
FIG. 2 is a flowchart illustrating an exemplary method of real-time 3D tracking, reconstruction, and feedback.

FIG. 2 illustrates a method of processing a sequence of image frames, which may be taken by a camera on a portable electronic device such that a user may move the device to acquire image frames from different perspectives, thus capturing 3D information. Some or all of the acts depicted in FIG. 2 may be performed while the sequence of images frames is being captured, with processing performed on frames earlier in the sequence while frames later in the sequence are being captured.

It should be appreciated that, though FIG. 2 is described from the perspective of a user operating a smartphone, this hardware is illustrative only. The camera may be located within any suitable portable electronic device and/or may be a standalone camera. The processing may be performed by programming a processor that receives the captured image frames from the camera hardware. That processor may be physically within the portable electronic device, in a server to which the portable electronic device is connected via a network or in any other suitable processor.

Capturing

An example of processing is shown in FIG. 2.

At act 1200: The user starts the capture process by pointing at a desired object with a live viewfinder and invoking the capture button, which may be, in the case of a smartphone, a soft button programmed to appear on a touch screen. The algorithm runs in the video mode and works as follows:

At act 1202: An image is retrieved from the camera 1204: A key frame is the reference frame for starting a new depth measurement. A frame may be identified by: 1) fixed framerate: triggers a key frame for every N incoming frames or 2) motion based: triggers a key frame only if there is significant movement since the last frame. In some embodiments, one strategy for selecting key frames may be used. Alternatively, programming on the portable electronic device may support either strategy and user configuration may determine the strategy or the strategy may be selected dynamically based on available processing, frame rate speed at which the user is moving the camera or other factors. Speed of motion may be determined, for example, by degree of overlap between successive frames in the sequence. For example, frames in a sequence may be designated as key frames at a rate that provides for greater than 25% overlap between a key frame and a successive image frame in the sequence. In some embodiments, that rate may be greater than 50% or greater than 75% overlap or any other suitable degree of overlap.

A key frame and other frames may both be processed to produce a depth map. However, in some embodiments, the processing on a key frame may produce a denser depth map and/or additional information about visual characteristics of an object being imaged. As a result, processing on the key frame may take longer than on other frames. However, when the results of processing of the key frames and other frames are stitched together, in the aggregate, there may be sufficient information for a user to recognize the object being imaged.

At act 1206: The navigation data from the IMU sensors is read out and associated with the frame.

At act 1208: Performs a basic quality image check (i.e. motion blur detection) and sends the data to the pipeline. It also synchronizes the timestamps of the IMU sensors information with the image.

At act 1210: Uses the navigation data and the previous trajectory to get a first estimate of the new pose. Navigation data may be derived from the outputs of the IMU sensors, indicating relative position of the portable electronic device at the time the image frame was captured. This position may be relative to an origin which may serve as a point of view of the 3D image being captured or represented in any other suitable coordinate system. Pose of the camera when the image was acquired may serve as an indication of the orientation of the image frame within the 3D image being constructed. For example, two image frames may have different poses if taken of different portions of the object being imaged or even of the same portion of the object, but with the camera rotated or tilted. This pose also serves as an estimate for basic feedback to the user in case block [1212] has lost track, and also serve as an initial estimate for relocalization. For example, the user may be instructed, such as by arrows or other indications on a display screen, to return the camera to a pose from which additional image frames can be collected to complete a 3D image.

At act 1212: Combined tracking and sparse reconstruction: Determines a refined pose by using minimizing the photogrammetric error between the current and the previous frame. The implementation uses a maximum likelihood estimate for the rigid body transformation to determine the new camera pose based on the camera pose associated with the previous image and a minimization of the photogrammetric error. The photogrammetric error is determined based on patches of the size of 8×8 pixels. The patches are placed at interest points based on corners and edgelets (potentially also other feature descriptors). Because a semi-direct approach is chosen, features are extracted only on a key frame. For every subsequent incoming image, the patches themselves track the feature implicit by minimizing the photogrammetric error and therefore the need for a computationally expensive full search operation is omitted. As a result, a sparse depth-map is created and the camera position retrieved. As an example of suitable processing, the process described in our co-pending application WO2015/173173

(which is hereby incorporated by reference) may be used. A formal description for this principle can be found in [30]:

IV. Motion Estimation

Figure 3:
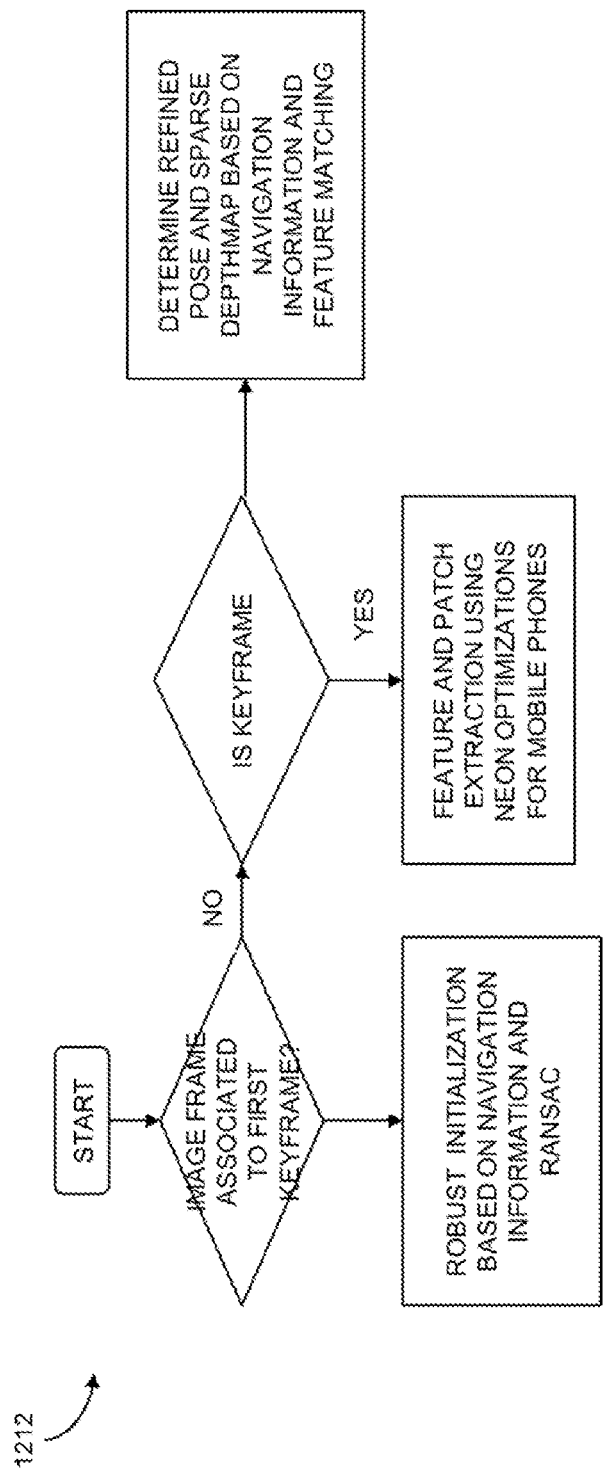
FIG. 3 is a flowchart illustrating in further detail an exemplary method real-time 3D tracking.

SVO computes an initial guess of the relative camera motion and the feature correspondences using direct methods and concludes with a feature-based nonlinear reprojection-error refinement. Each step is detailed in the following sections and illustrated in FIGS. 2 to 4.

A. Sparse Model-Based Image Alignment

The maximum likelihood estimate of the rigid body transformation $T_{k,k-1}$ between two consecutive camera poses minimizes the negative log-likelihood of the intensity residuals:

$$T_{k,k-1} = \underset{T}{\operatorname{argmin}} \int\int_{\bar{\mathcal{R}}} \rho[\delta I(T,u)] du. \qquad (4)$$

The intensity residual $\delta I$ is defined by the photometric difference between pixels observing the same 3D point. It can be computed by back-projecting a 2D point u from the previous image $I_{k-1}$ and subsequently projecting it into the current camera view:

$$\delta I(T,u) = I_k(\pi(T \cdot \pi^{-1}(u,d_u))) - I_{k-1}(u) \forall u \in \bar{\mathcal{R}}, \qquad (5)$$

where $\bar{\mathcal{R}}$ is the image region for which the depth $d_u$ is known at time k−1 and for which the back-projected points are visible in the current image domain:

$$\bar{\mathcal{R}} = \{u | u \in \mathcal{R}_{k-1} \wedge \pi(T \cdot \pi^{-1}(u,d_u)) \in \Omega_k\}. \qquad (6)$$

For the sake of simplicity, we assume in the following that the intensity residuals are normally distributed with unit variance. The negative log likelihood minimizer then corresponds to the least squares problem: $\rho[.] \cong \frac{1}{2}\|.\|^2$. In practice, the distribution has heavier tails due to occlusions and thus, a robust cost function must be applied [10].

In contrast to previous works, where the depth is known for large regions in the image [8]-[10], [24], we only know the depth $d_{u_i}$ at sparse feature locations $u_i$. We denote small patches of 4×4 pixels around the feature point with the vector $I(u_i)$. We seek to find the camera pose that minimizes the photometric error of all patches (see FIG. 2):

$$T_{k,k-1} = \arg\min_{T_{k,k-1}} \sum_{i \in \bar{\mathcal{R}}} \|\delta I(T_{k,k-1}, u_i)\|^2. \qquad (7)$$

At act 1214: The frame is sent to the display for retaining a live camera feed. It is sent after pose estimation in block [1212] to ensure that user real-time feedback can be augmented into the frame, but before the dense depth-map calculations in [1222] to keep the latency of the user feedback below 20 ms.

At act 1216: If no or only a minority of the patches in block [1214] have converged to a local minima in terms of the photogrammetric error, then track has been lost. If the tracking is lost, a relocalization routine is performed until a known pose is found again. Relocalization is performed by matching the incoming image in a pair-wise manner to previously known key frames.

At act 1218: Whether an image is a key frame is defined in block [1204]. At that point, a key frame does not have any depth information available yet. In some embodiments, the branch illustrated at clock 1218 may be performed only once such that, in the first iteration on a key frame, processing in block 1220 may be performed and in subsequent iterations, processing may proceed to block 1222, regardless of whether the frame is a key frame.

At act 1220: If a current frame was declared as key frame, all per pixel depth estimates of this frame are initialized with a default probability and default depth.

The default probability can be based on some prior knowledge to significantly increase the convergence rate. For example, focus information from camera hardware may provide an initial depth estimate, but such an initial estimate may be obtained in any suitable way. However, any "prior" information, including the depth determined for a prior frame, the depth determined from a prior frame offset by projected motion information of the camera or information determined from the content of the image frame, may be used. In cases in which successive image frames overlap, the depth information from the prior frame may be used to initialize the overlapping portions and other information, such as the average depth in the overlapping portions, may be used as an initial estimate for the rest of the frame.

This technique may be applied using as the prior frame the immediately preceding key frame in the sequence of image frames. If no priors are available, the mean depth of all pixel depths is initialized with a uniform distribution with the known mean assumed from the focus distance.

More advanced cases are below that significantly speed up the depth-map computation time.

Leveraging of Motion Priors:

The depth can be initialized with depth information extracted from the previous key frame, if overlap is available. It simply uses the forward motion estimation to displace the per-pixel information as a fast initialization.

Leveraging of Depth Priors:

If a specific use case is at hand, for example a face is captured with the user facing camera, then the depth map could be a generic face with the face being placed at the distance of an arm length. In our case, this is implemented with a simple face detector and tracker for fiducial points of the face to load a mean model of a face as initialization. In this example, the model of the face is the "prior"—as it is based, at least in part, on information available prior to collecting the image data (i.e. the general shape of a face).

At act 1222: Dense reconstruction: If a current frame is not a key frame, the probabilities and the depth estimate for each pixel in the latest key frame is refined. An example of computations suitable for this computation may be found in [11]. In this example, the depth model is computed based on the assumption that the measured depth is normally distributed around the true depth and an outlier measurement (uniform distribution within a minimum and maximum depth). For that, the depth of every pixel is represented with a Beta distribution for the inlier ratio and a Gaussian distribution for the depth. In every refinement step, these parameters are updated, until they either converge or diverge for the following formula (eq 4 of [11]):

$$q(\hat{d}, \rho | a_k, b_k, \mu_k, \sigma_k^2) = \text{Beta}(\rho | a_k, b_k) \mathcal{N}(\hat{d} | \mu_k, \sigma_k^2),$$

The depth computation is done by triangulation from the view of the image and the view from the key frame. At the end, smoothness on the resulting depth-map may be enforced by minimizing a regularized energy function. The regularization follows a weighted Huber norm and uses depth uncertainty for the smoothing and convex formulations for a highly parallel implementation. This ensures that depth information with high confidence is kept unmodified, and depth information with low confidence is adapted more towards the depth information of the neighboring pixels.

For the calculation of the depth information, the sparse depth information coming from the pose calculations in block [1212] are reused.

In some embodiments, the refinement of the depth information in a key frame can be placed into a queue and processed in parallel. If the queue grows, multiple processors can process multiple key frames in parallel. In another embodiment, multiple processors can execute the refinement on different pixels in parallel.

Figure 4:
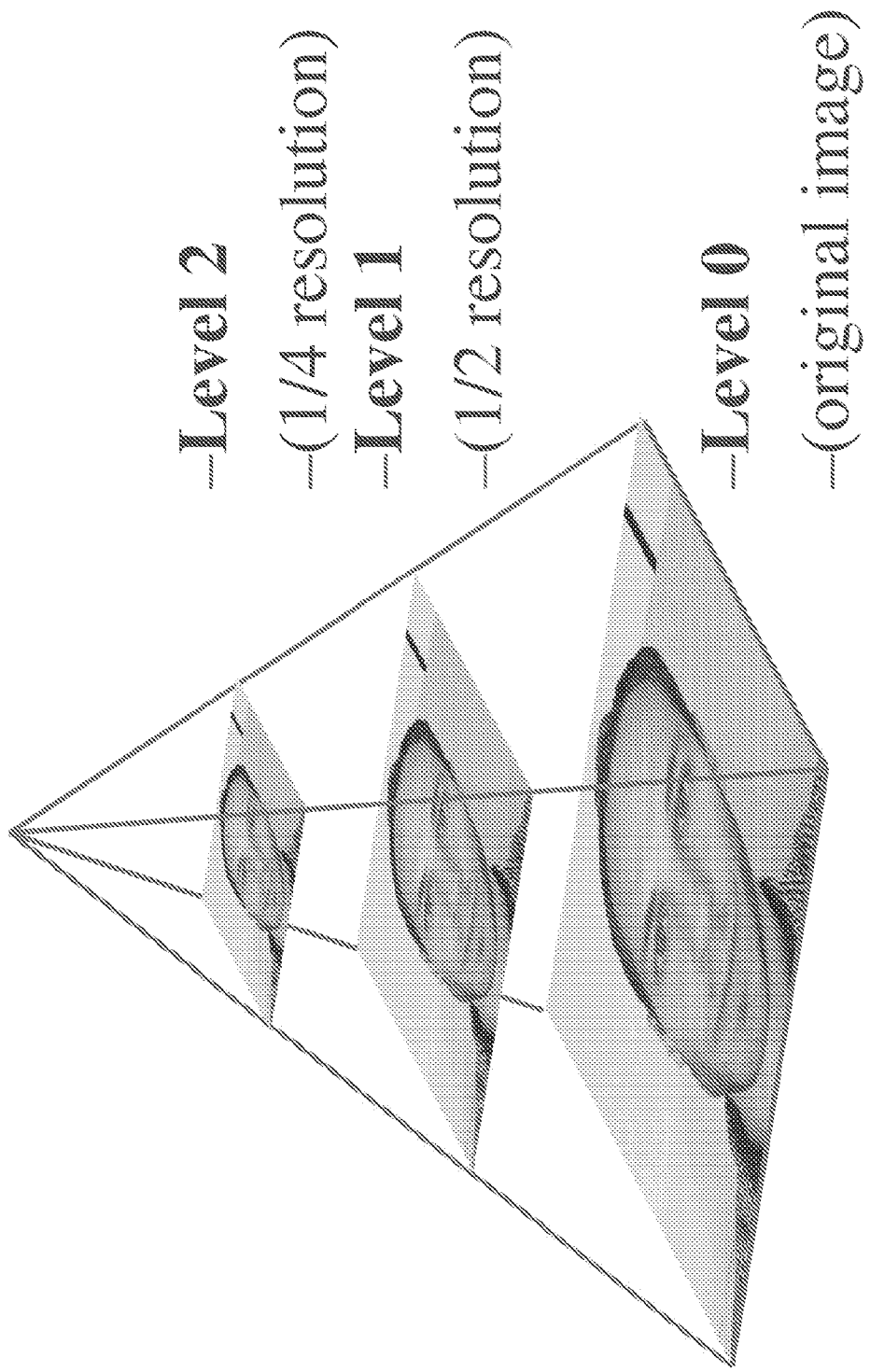
FIG. 4 is a sketch conceptually illustrating "pyramid levels," implemented by processing image frames with greater or lesser resolution.
Figure 5B:
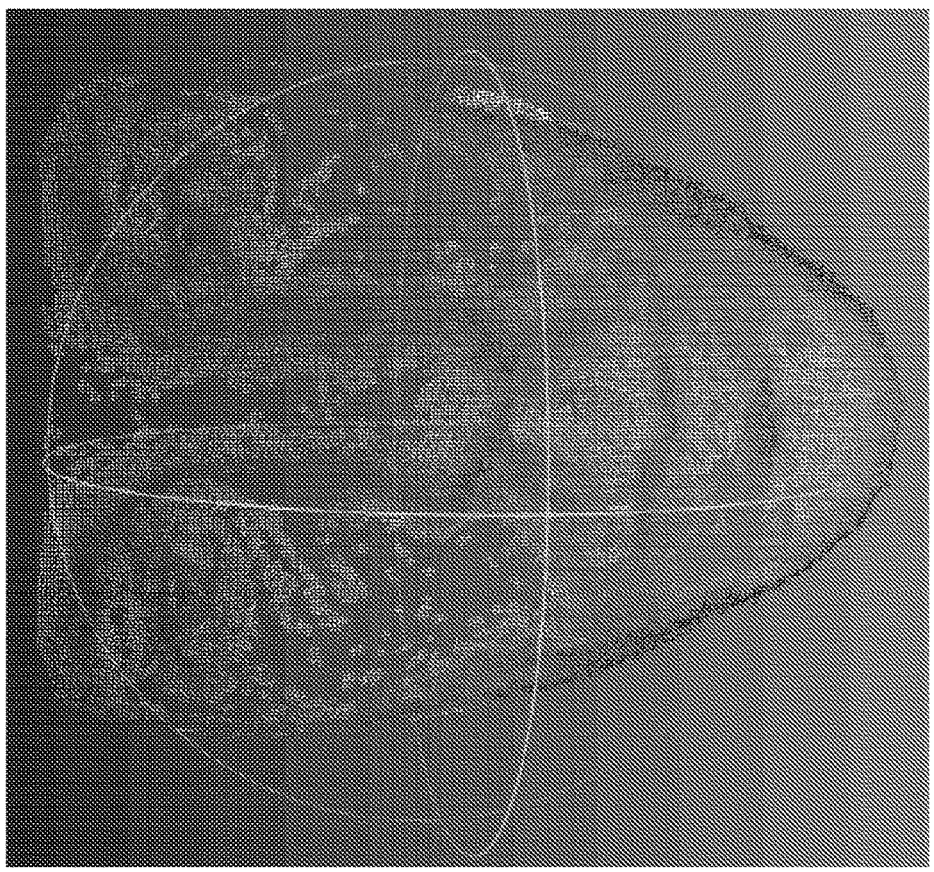
FIGS. 5A and 5B illustrate graphically, a depth map made by processing at pyramid level 2 (FIG. 5A) versus level 1 (FIG. 5B), in which level 1 has greater resolution than level 2.
Figure 5A:
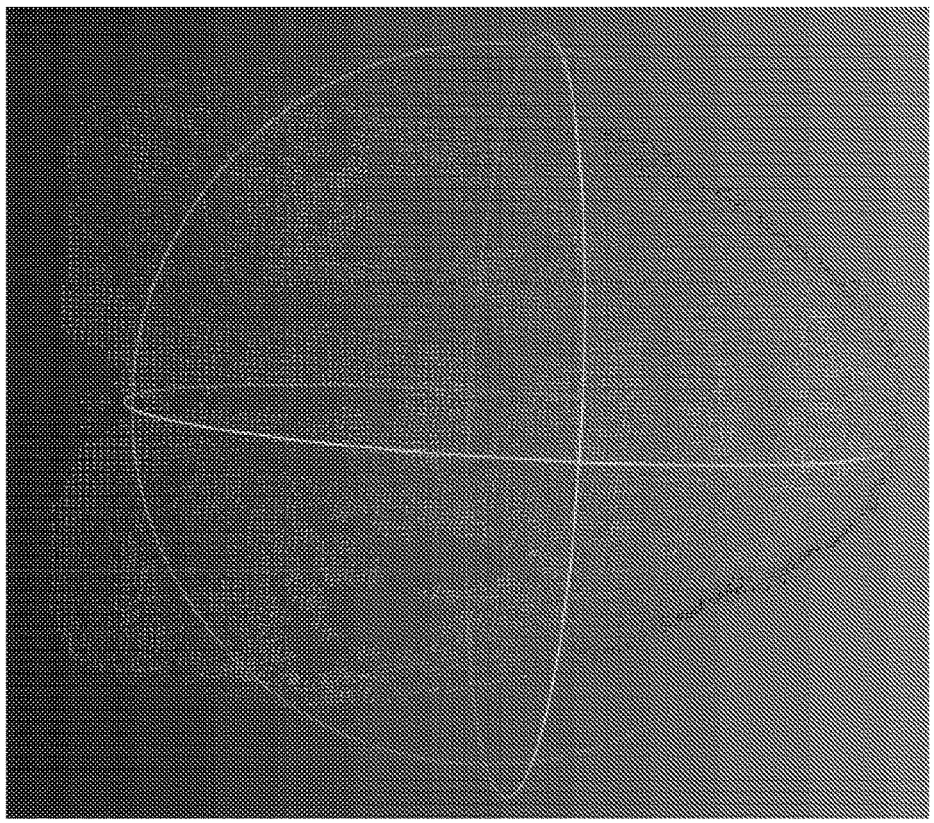

In addition, depending on the available computing power, the dense depth reconstruction is performed on a different resolution. We use simple image pyramid routines to switch between different resolutions dynamically. This means that a RGB key-frame can have a depth-map of equal or lower resolution. Choosing a higher pyramid level (i.e. lower resolution for frames) for dense reconstruction reduces the computational effort required but also decreases density. FIG. 4 illustrates "pyramid levels," implemented by processing image frames with greater or lesser resolution. FIGS. 5A and 5B illustrate graphically, a depth map made by processing at pyramid level 2 versus level 1. In both cases, the depth map provides useful information, sufficient to enable a user to recognize an object being imaged.

On recent smartphone generations, a pyramid level 1 is performing well to ensure a real-time operation. However, different pyramid levels, and different resolutions associated with the pyramid levels, may be used depending on data rate, available processing and other factors. In some embodiments, the pyramid level used may be predetermined, while in other embodiments, the pyramid level may be dynamically selected. For example, the pyramid level may be selected in some embodiments in proportion to the size of a queue of image frames waiting processing.

At act 1224: If the number of pixels which have converged depth information exceed a defined threshold, then this key frame has converged depth information.

As an alternative, a certain number of refinement iterations can be used as this measure.

Another alternative is that a certain minimum baseline needs to be available if comparing the angle of the latest image with the angle of the key frame.

At act 1226: If there are pixels with converged depth information, the data is integrated into a global map structure consisting of probabilistic point cloud data and camera poses. The data is added by an initial rigid alignment with the data from the previous key frame in the map.

At act 1228: A loop-detection algorithm determines whether a loop-closing situation exists and triggers a global optimization that reduces the inconsistencies by spreading out the error. For this, first a global loop closing is performed on all the key frames with their corresponding relative pose. Then a global non-rigid registration is performed on all the depth data from all key frames which are residing in the global map. A non-rigid registration is performed to redistribute the alignment error uniformly over the global map. By this, the depth data is deformed, by keeping the depth data of the key frames as rigid as possible.

At act 1230: Based on the current view-point, a simple Poisson-based meshing is applied on the point cloud. As an alternative, the convex hull of the point cloud can be generated as a visualization strategy for feedback progress to the user.

At act 1232: The projected texture of the mesh can be either simple uniform color, taken from the current viewpoint or done as a global texture map by using a Poisson-blending approach At act 1234: Mesh and texture are combined with corresponding UV coordinates and rendered from the viewpoint of the current pose of the camera, such that it matches the exactly with the image shown to the user.

At act 1236: The rendered and textured mesh is superimposed on the viewfinder image and visualized to guide the user—areas with low/no depth confidence due to occlusions remain uncovered until a user moves the phone into a different position. Accordingly, it should be understood that confidence may be determined based on completeness of data, with a higher confidence being assigned to regions of an object for which there is adequate image data to compute a 3D model and a lower confidence being assigned to regions of an object for which the image data is not sufficient to compute a 3D model. However, in some embodiments, confidence values may be determined such that higher confidence values are assigned when there are a sufficient number of image frames depicting a region to allow multiple independent calculations of the 3D model of a region and a confidence value may be assigned in proportion to the number of independent computations and/or percentage of such computations that yield consistent 3D models. Accordingly, confidence may be a metric computed quantitatively having a range of values, or may be a binary value, indicating that there is or is not sufficient data to compute a 3D depth map for a region of an object, or may have any other suitable form.

FIGS. 6A-6E illustrate an exemplary process in which feedback is provided based on confidence of a 3D model. FIG. 6A represents a photograph of an object, here a person. FIG. 613 represents an image that may be displayed through the viewfinder to guide the user early in the scanning process. This image may be displayed without color information. Also, as shown in FIG. 6B, portions of the image are shown as blotches, representing portions of the object for which there is inadequate depth information to render that portion of the image. FIG. 6C represents a refined image that may be displayed at a later stage of the scanning process. The image of FIG. 6C may still be displayed without color information, reducing the amount of processing required to achieve that image. FIG. 6C, however, has the blotchy portions of FIG. 613 replaced by depth information. FIG. 6D represents the same object being imaged, with additional information, such as color, added to portions of the image. FIG. 6E represents the finished image, including depth and other image information such as color, rendered from a 3-D model, which may then be used for other purposes.

At act 1238: The capture process continues until a user stops the process.

At act 1240: Key frames are stored with their associated probabilistic depth map information and camera information.

Exemplary Details of Act 1240

In some embodiments, JPEG EXIF headers may be used to store per view information. The depth map resolution can be equal or smaller than the resolution of the key frame. As an extension to Adobe XMP format, for example, the following information can be stored in the EXIF header:

Depth values per pixel as JPEG (similar to Google Depth-map format)
Confidence values per pixel as JPEG
Range (i.e. nearest point, farthest point)
Camera Pose
Camera Intrinsics
Use-case specific trackers (e.g. in our face scan mode it stores 14 fiducial points for eyes, nose, mouth as well as the face outline as polygon)

This data allows for later post-processing operations and reconstruction with different algorithms in a portable and synchronized way.

Final Modeling

Figure 7C:
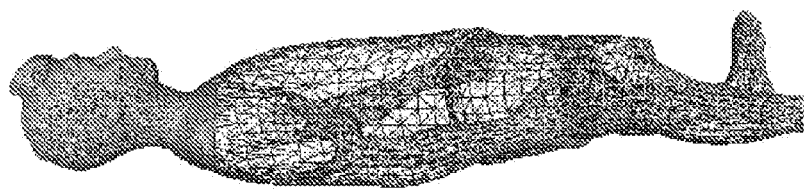
FIGS. 7A-7C illustrate merging of 3D image information with a model, with FIG. 7A illustrating a model of a person and FIGS. 7B and 7C illustrating merging 3D image information with the model.
Figure 7B:
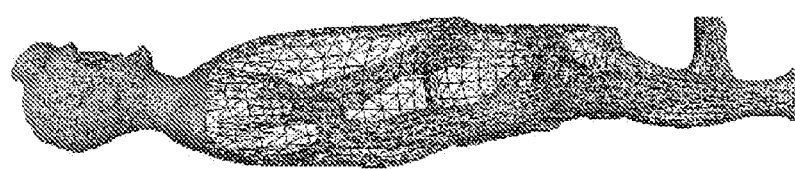
Figure 7A:
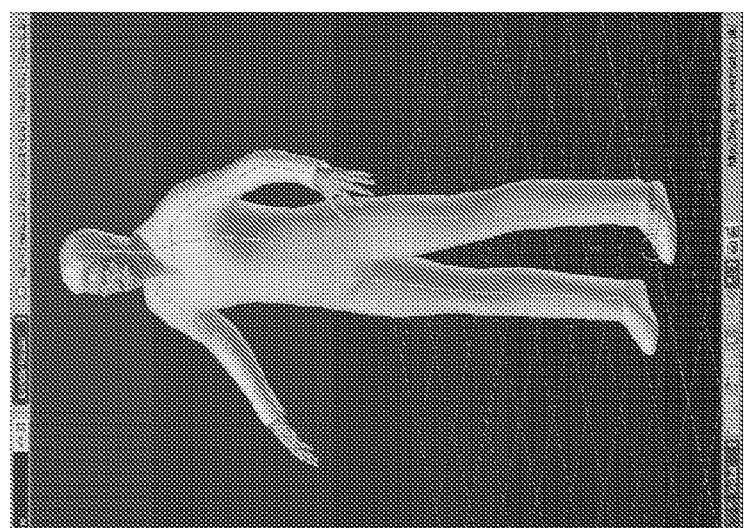

The final modeling is a post-processing step to the capturing which can be run in the background or on another processor. Post-processing may be used to attain higher resolution results by performing more computationally intensive meshing algorithms, 3D print-compatible meshing and texturing approaches. In contrast to the live-feedback, this not only takes the relevant views from a view-point into account, but performs a global mesh and texture. The following acts may be performed as part of this post-processing. These acts may be performed in the order listed or in any other suitable order:

- Loading of key frames and associated meta-data (depth map, probability map, camera poses, camera intrinsics)
- Generate point-clouds from meta-data
- Rigid and non-rigid registration of probabilistic point-clouds
- Conversion into standard point-cloud: Optimize global alignment and remove outliers by using probability of depth-points with adaptive thresholding
- Optional merging with a template model
- Perform Poisson-based meshing to achieve watertight and smooth meshing results by using a non-linear weighting of the smoothness factor by taking color gradients into account for edge preservation—this can also include the usage of shape priors such as visual hull principles to compensate for occlusion problems
- Generate a global texture map
- Store results as mesh file and associated textures Optionally, a merge of scan with a high resolution template model can be conducted. In our implementation, we can merge a user's face scan with a 3D printable and fully rigged stock model for the rest of the body by performing the following acts, in the order listed or in any other suitable order:

- As an extension to the previous meshing and texturing, additional metadata is used
- A fully rigged model typically has a built-in skeleton with joints and animation areas
- By using the meta-data from a single or multiple key frames, an accurate position of the anchor/docking points can be retrieved. This allows for making eyes, mouth etc. instantly available for animation
- The outline of the face in the meta-data is used as an initial point for integrating the scan with the stock model
- The rigged model contains deformation points to adjust the model towards the scan (e.g. adjusting the head-shape to face width/length)
- Based on the face outline of the metadata, this ensures now an area that contains points of the template model and the face model in close proximity
- The template model points in a certain area are used in addition to the scan points to ensure a closely coupled mesh
- texture color of the template model is adapted to the mean color of the face scan—this is done by using a skin color mask for the template model
- Finally, the texture seams are blended using a graph-cut method to ensure that no visible stitching areas are visible FIGS. 7A-7C illustrate an example of such processing. FIG. 7A depicts a template model—in this case a model of a human. This model may be used to add information to a three-dimensional model developed by scanning a person to acquire three dimensional information using image frames in a sequence. As shown, the template model may include features of the human, such as arms, hands, fingers, legs, a face, eyes, and a mouth. These features of the human may be used to attach additional information to the 3-D model being developed. For example, surfaces in the 3D model that, according to the template model, represent skin may be colored with flesh tones. Likewise, portions that correspond to clothes may be depicted with texture of cloth or even overlaid with image information depicting clothes.

FIG. 7C illustrates an example of how image information may be overlaid on the model. In this example, the template model has been used to identify a portion of the 3D model representing the face of the person being imaged. An image of the person's face is then overlaid on that portion of the 3D model, producing a more realistic model of the actual portion whose image was 3D image was captured using techniques as described above.

Interactive Configuration

To leverage the abilities of mobile scan with the flexibility of 3D printing. The flow is as follows:

- Model is loaded into viewer assuming a certain scale (e.g. 1:20)
- User can adjust the models pose according to the rigged points
- A 3D printability check is performed each time the configuration changes
- This check includes a visualization of structural problems (wall-thickness, center of gravity, risk of breaking) with colors of red/green. Accordingly, while 3D printability is one measure of the correctness of a 3D model, other techniques for checking the 3D model
- The check is updated live so that a user always gets a "What you see is what you get" experience for expectable 3D printing results
- Configuration might include the following options:
- Size of the figurine
- Facial expressions & pose of the figurine (due to rigged model)
- Clothing
- Hair style/headwear
- Skin color
- Customizable clothing or assets (e.g. generate a text on a figurine's shirt or sign which is held by the figurine)
- Floor plates (where & how the figurines are fixed)
- Backdrops
- This can also include multiple figurines and other 3D stock models to create unique constellations for 3D content sharing and 3D printing.

The result can be also used in video games as 3D playable avatars due to the rigged model.

The present application describes multiple embodiments. One of skill in the art will understand that features, described in connection with one embodiment, may be used in other embodiments such that the described features may be used in any suitable combination. Additional features may also be present. For example, depending on the nature of the portable electronic device, one or more additional elements may be present. For example, a smart phone or other portable electronic device may sensors such as a global positioning system (GPS) to sense location. Processing as described herein may be implemented as an application executing on an operating system. The operating system may include utilities to control the camera, sensors and other hardware to capture data from them and make it available to the application executing on the computing device. However, in some embodiments, interactions with the hardware elements may be controlled by custom software loaded on the device.

As another example, in some embodiments, a computing device may include a network interface to implement a personal area network or to connect to a LAN or WAN such that data, and in some embodiments processing load, may be shared with other devices. Such an interface may operate in accordance with any suitable technology, including a Bluetooth, Zigbee or an 802.11 ad hoc mode, for example.

RELATED ART

The following related art is incorporated herein in its entirety.

Patents

U.S. Pat. No. 7,103,211
U.S. Pat. No. 8,243,123
U.S. Pat. No. 8,655,094
U.S. Pat. No. 8,659,596
U.S. Pat. No. 8,982,122
US20040041804
US20060003111
US20090066693
US20130307848
WO2014092740
WO2015173173

Non-Patent Refs

[1] Baran, I. & Popović, J., 2007. Automatic rigging and animation of 3D characters. *Acm Tog*, 26, pp. 1-8.
[2] Blanz, V. & Vetter, T., 1999. A morphable model for the synthesis of 3D faces. *Proceedings of the 26th annual conference on Computer graphics and interactive techniques—SIGGRAPH '99*, pp. 187-194.
[3] Curless, B., 1999. From range scans to 3D models. *ACM SIGGRAPH Computer Graphics*, 33(4), pp. 38-41.
[4] Forster, C. et al., 2013. Collaborative monocular SLAM with multiple Micro Aerial Vehicles. *IEEE International Conference on Intelligent Robots and Systems*, 143607 (200021), pp. 3963-3970.
[5] Forster, C. et al., 2015. Continuous On-Board Monocular-Vision-based Elevation Mapping Applied to Autonomous Landing of Micro Aerial Vehicles. *IEEE International Conference on Robotics and Automation (ICRA)*.
[6] Forster, C. & Carlone, L., 2015. IMU Preintegration on Manifold for Efficient Visual-Inertial Maximum-a-Posteriori Estimation. *Robotics: Science and Systems (RSS)*.
[7] Hirshberg, D. a. et al., 2012. Coregistration: Simultaneous alignment and modeling of articulated 3D shape. *Lecture Notes in Computer Science (including subseries Lecture Notes in Artificial Intelligence and Lecture Notes in Bioinformatics)*, 7577 LNCS(PART 6), pp. 242-255.
[8] Lanman, D. & Taubin, G., 2009. Build Your Own 3D Scanner: 3D Photography for Beginners. *ACM SIGGRAPH 2009 Courses*, p.94.
[9] Li, H. et al., 2013. 3D self-portraits. *ACM Transactions on Graphics*, 32, pp. 1-9.
[10] Majdik, A. L. et al., 2014. Micro air vehicle localization and position tracking from textured 3D cadastral models. *2014 IEEE International Conference on Robotics and Automation (ICRA)*, pp. 920-927.
[11] Pizzoli, M., Forster, C. & Scaramuzza, D., 2014. REMODE: Probabilistic, Monocular Dense Reconstruction in Real Time. *Proc. IEEE International Conference on Robotics and Automation (ICRA)*, pp. 2609-2616.
[12] Saurer, O., Pollefeys, M. & Lee, G. H., A Minimal Solution to the Rolling Shutter Pose Estimation Problem.
[13] Tanskanen, P. et al., 2013. Live Metric 3D Reconstruction on Mobile Phones. 2013 *IEEE International Conference on Computer Vision*, pp. 65-72.
[14] Tanskanen, P. et al., Semi-Direct EKF-based Monocular Visual-Inertial Odometry.
[15] Vlasic, D. et al., 2009. Dynamic shape capture using multi-view photometric stereo. *ACM Transactions on Graphics*, 28, p.1.
[16] Weise, T., Li, H., et al., 2009. Face/Off. *Proceedings of the 2009 ACM SIGGRAPH/Eurographics Symposium on Computer Animation—SCA '09*, p. 7.
[17] Weise, T., Wismer, T., et al., 2009. In-hand scanning with online loop closure. 2009 *IEEE 12th International Conference on Computer Vision Workshops, ICCV Workshops 2009*, pp. 1630-1637.
[18] Weise, T. et al., 2011. Online loop closure for real-time interactive 3D scanning. *Computer Vision and Image Understanding*, 115(5), pp. 635-648.
[19] Faessler, M., Fontana, F., Forster, C., Mueggler, E., Pizzoli, M., & Scaramuzza, D., 2015. Autonomous, Vision—based Flight and Live Dense 3D Mapping with a Quadrotor Micro Aerial Vehicle. *Journal of Field Robotics*.
[20] http://www.structure.io
[21] http://www.google.com/atap/project-tango
[22] http://intel.com/realsense
[23] http://www.mv4d.com
[24] https://www.qualcomm.com/videos/3d-reconstruction-depth-stereo
[25] http://www.fyu.se
[26] http://aquilaviz.com
[27] http://www.trnio.com
[28] http://www.seene.co
[29] http://www.123dapp.com
[30] Forster, C., Pizzoli, M., Scaramuzza, D., 2014. SVO: Fast Semi-Direct Monocular Visual Odometry

Having thus described several aspects of at least one embodiment of this invention, it is to be appreciated that various alterations, modifications, and improvements will readily occur to those skilled in the art.

As one example, variations in the algorithms described herein may be used. In some embodiments, the system may use fast features and edgelets for feature and patch extraction in block [1212].

In some embodiment, the system may use, in addition to fast features and edgelets, stronger features for places with a small density of feature distribution in block [1212].

In some embodiment, the system captures an image frame and inertia information associated with movement of the portable electronic device correlated in time. This information may be provided for processing as a package with timestamps which are synchronized such that they can be associated to each other using a shared clock.

In some embodiments, whenever there is a key frame, the system uses the image sequence from prior to the key frame for refinement of the probabilistic depth information.

In some embodiment, the system is using every image frame as a key frame and therefore providing a continuous stream of probabilistic depth maps, by reusing computational expensive operations and by reusing intermediate results from the previous calculations.

In some embodiment, the system is determining whether relocalization is required and in that case tries to recover from this state by searching the full map to find the current pose.

As an example of another variation, techniques as described herein may be used for tracking and 3D sensing for Virtual Reality headsets. Though a smartphone is used as an example of a portable electronic device that may be used to capture and/or process image frames, other electronic devices may be used for either or both of these functions. In some embodiment, the system is mounted on a virtual reality or augmented reality headset and can use several independent cameras to cover a full 360 view.

As an example of yet another variation, techniques as described herein may be applied in any application in which it is desirable to merge and configuring image information.

For example, the techniques may be used to create photorealistic 3D printable avatars based on partial scan data on smartphones. In some embodiment, a system and method for creating and configuring 3D printable figurines of people is presented. Such a system may merge a scan of a user or other person's face, head or body with a specifically annotated high resolution and 3D print-ready mesh of a person. The scan of the user might be done with a user or world-facing camera of a smartphone.

In some embodiment, the whole process can run locally on a mobile handheld device due to space efficient and annotated template models and smart merging algorithms.

In some embodiment, the merging template uses a graph-cut approach to ensure seamless texture and geometry synthesis.

In some embodiment, the merging template uses defined & fixed merging regions.

In some embodiment, the merging template contains a fully rigged motion skeleton to which also the scan data is attached thus enabling to easily generate new poses, facial expressions, or animation of the final avatar.

In some embodiment, the generated 3D character becomes instantly playable in video games. Such an embodiment may be used in a system, including a video game processor for example, in which the output of a processor processing image frames as described herein is supplied to the video game processor. The video game processor may be programmed to use the output of the image frame processing to render an avatar within the game— allowing a user to place themselves or any other person in the game by scanning themselves.

In some embodiment, the merging template contains defined docking points for configuring clothing or accessories.

In some embodiment, the merging template contains annotations for aligning the newly created avatar with a second figurine and changing text or textures on both figurines.

In some embodiment, the configurator includes custom floor plates, backdrops, regions for custom text.

In some embodiment, the 3D printability (e.g. too thin areas, not stable enough, bad center of gravity, etc) is visualized immediately with color flags while changing configuration options.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets.

As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. Alternatively, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A non-transitory computer readable medium encoding processor-executable instructions that, when executed by at least one hardware processor, perform a method of forming a three-dimensional (3D) representation of an object from a plurality of image frames depicting the object from a plurality of orientations, the method comprising, iteratively:
    computing 3D information about the object based on processing the plurality of image frames, wherein the plurality of image frames comprises higher resolution image frames and lower resolution image frames interleaved with the higher resolution image frames, wherein:
        processing the higher resolution image frames comprises computing depth information for the object, the depth information comprising a plurality of depth estimates for pixels of the higher resolution image frames, and associated confidence values; and
        processing the lower resolution image frames comprises refining the computed depth information for the object by adjusting the plurality of depth estimates an amount determined from pixels of the lower resolution image frames and weighted by the confidence values associated with the plurality of depth estimates; and
    displaying a representation of the object based on the 3D information, wherein the representation of the object changes based on the computed depth information being refined.

2. The non-transitory computer readable medium of claim 1, wherein:
    computing 3D information comprises determining confidences with which the computed 3D information represents regions of the object; and
    displaying the representation of the object comprises visually differentiating regions of the object for which the 3D information has a higher confidence from regions of the object for which the 3D information has a lower confidence.

3. The non-transitory computer readable medium of claim 1, wherein the computer-executable instructions are formatted for execution by a processor of a smartphone.

4. The non-transitory computer readable medium of claim 1, wherein:
the processor executable instructions are formatted for execution by a processor of a portable electronic device comprising a camera and a display; and
displaying the representation of the object comprises displaying the representation after processing a first portion of the plurality of image frames while capturing a second portion of the plurality of image frames.

5. The non-transitory computer readable medium of claim 1, wherein:
the plurality of image frames comprise a stream of image frames captured with a camera; and
the method further comprises selectively capturing image frames of the higher resolution image frames at a predetermined frequency and/or based on a rate of motion of the camera.

6. The non-transitory computer readable medium of claim 1, wherein:
the 3D information comprises a mesh, representing 3D locations of features of the object and processing the plurality of image frames comprises computing the mesh from the computed depth information.

7. The non-transitory computer readable medium of claim 1, wherein:
displaying the representation of the object comprises depicting surfaces based on the 3D information with a surface characteristic based on the at least one image frame of the plurality of image frames.

8. The non-transitory computer readable medium of claim 7, wherein:
computing 3D information comprises determining confidences with which the computed 3D information represents regions of the object; and
displaying the representation of the object comprises presenting surfaces with a surface characteristic representing regions of the object for which the 3D information has a higher confidence and surfaces without the surface characteristic representing regions of the object for which the 3D information has a lower confidence.

9. A portable electronic device comprising at least one hardware processor, a camera and a display, wherein the portable electronic device is configured to perform a method of forming a three-dimensional (3D) representation of an object from a stream of image frames captured with the camera, the stream comprising a plurality of image frames depicting the object from a plurality of orientations, the method comprising, iteratively:
computing 3D information about the object based on computing depth information by:
generating a plurality of depth estimates by processing a first subset of the plurality of image frames at a first, higher resolution; and
refining the generated plurality of depth estimates by processing a second subset of the plurality of image frames at a second, lower resolution,
wherein the image frames processed at a lower resolution are interleaved with the image frames processed at a higher resolution;
displaying a first representation of the object based on the 3D information computed after image frames of a first portion of the stream of image frames have been processed, the first portion of the stream of image frames comprising one or more of the first subset of the plurality of image frames at the first, higher resolution and one or more of the second subset of the plurality of image frames at the second, lower resolution; and
displaying a second representation of the object after the first portion and a second portion of the stream of image frames have been processed.

10. The portable electronic device of claim 9, wherein:
computing 3D information comprises determining confidences with which the computed information represents regions of the object; and
displaying the first representation of the object comprises visually differentiating regions of the object for which the 3D information has a higher confidence from regions of the object for which the 3D information has a lower confidence.

11. The portable electronic device of claim 9, wherein computing the 3D information comprises selecting the first subset of the plurality of image frames from the stream at a predetermined frequency.

12. The portable electronic device of claim 9, wherein:
the portable electronic device comprises an inertial measurement unit; and
computing the 3D information comprises selecting the first subset of the plurality of image frames from the stream based on a rate of motion of the portable electronic device as indicated by the inertial measurement unit.

13. The portable electronic device of claim 9, wherein displaying the first representation of the object comprises superimposing a mesh, representing 3D locations of features of the object, on an image of the object.

14. The portable electronic device of claim 9, wherein displaying the first representation of the object comprises depicting surfaces based on the 3D information with a surface characteristic based on at least one image of the plurality of image frames.

15. A portable electronic device comprising at least one hardware processor, a camera and a display, wherein the portable electronic device is configured to perform a method of forming a three-dimensional (3D) representation of an object from a stream of image frames captured with the camera, the stream comprising a plurality of image frames depicting the object from a plurality of orientations, the method comprising, iteratively:
computing 3D information about the object based on computing depth information by:
generating a plurality of depth estimates and associated confidence values based on a first subset of the plurality of image frames at a first, higher resolution; and
adjusting the generated plurality of depth estimates based on a second subset of the plurality of image frames at a second, lower resolution and based on the confidence values associated with the plurality of depth estimates,
wherein the image frames processed at a lower resolution are interleaved with the image frames processed at a higher resolution; and
displaying a first representation of the object based on the 3D information computed after image frames of a first portion of the stream of image frames have been processed and displaying a second representation of the object after the first portion and a second portion of the stream of image frames have been processed.

16. The portable electronic device of claim 15, wherein displaying the first representation of the object comprises visually differentiating regions of the object for which the plurality of depth estimates have a higher confidence value from regions of the object for which the plurality of depth estimates have a lower confidence value.

17. The portable electronic device of claim 15, wherein computing the 3D information comprises selecting the first subset of the plurality of image frames from the stream at a predetermined frequency.

18. The portable electronic device of claim 15, wherein:
the portable electronic device comprises an inertial measurement unit; and
computing the 3D information comprises selecting the first subset of the plurality of image frames from the stream based on a rate of motion of the portable electronic device as indicated by the inertial measurement unit.

19. The portable electronic device of claim 15, wherein displaying the first representation of the object comprises superimposing a mesh, representing 3D locations of features of the object, on an image of the object.

20. The portable electronic device of claim 15, wherein displaying the first representation of the object comprises depicting surfaces based on the 3D information with a surface characteristic based on at least one image of the plurality of image frames.

* * * * *